(12) United States Patent
Wu

(10) Patent No.: US 10,264,061 B2
(45) Date of Patent: Apr. 16, 2019

(54) USER SERVICE ACCESS ALLOCATION METHOD AND SYSTEM

(71) Applicant: TENCENT TECHNOLOGY (SHENZHEN) COMPANY LIMITED, Shenzhen (CN)

(72) Inventor: Changhui Wu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 360 days.

(21) Appl. No.: 15/168,551

(22) Filed: May 31, 2016

(65) Prior Publication Data

US 2016/0277489 A1 Sep. 22, 2016

Related U.S. Application Data

(63) Continuation of application No. PCT/CN2014/093876, filed on Dec. 15, 2014.

(30) Foreign Application Priority Data

Dec. 17, 2013 (CN) .......................... 2013 1 0695508

(51) Int. Cl.
*H04L 29/08* (2006.01)
*H04W 48/20* (2009.01)

(52) U.S. Cl.
CPC ...... *H04L 67/1012* (2013.01); *H04L 67/1004* (2013.01); *H04L 67/1021* (2013.01); *H04W 48/20* (2013.01)

(58) Field of Classification Search
CPC ............... H04W 48/20; H04L 67/1012; H04L 67/1004; H04L 67/1021

(Continued)

(56) References Cited

U.S. PATENT DOCUMENTS 9,116,752 B1 * 8/2015 Petit-Huguenin ..... G06F 9/5083
2003/0105835 A1 * 6/2003 Hori ..................... H04L 63/0428
709/219

(Continued)

FOREIGN PATENT DOCUMENTS

CN 101557344 A 10/2009
CN 101778135 A 7/2010

(Continued)

OTHER PUBLICATIONS

The World Intellectual Property Organization (WIPO) International Search Report for PCT/CN2014/093876 dated Mar. 23, 2015.

(Continued)

*Primary Examiner* — James E Springer
(74) *Attorney, Agent, or Firm* — Anova Law Group, PLLC

(57) ABSTRACT

A service access allocation method is provided. The method includes providing a plurality of access points for an entire region divided into a plurality of divided areas, where each divided area includes one or more access points. The method also includes, based on the divided areas and a total number of service accessing users corresponding to each divided area, obtaining a weighting coefficient of each divided area. Each divided area has a plurality of service accessing users. Further, the method includes using the weighting coefficient corresponding to each divided area to perform a weighted random calculation to determine one of the plurality access points allocated to a current user to access a service at nearest proximity, such that the current user accesses the allocated access point to obtain the service provided by the allocated access point.

18 Claims, 6 Drawing Sheets

(58) Field of Classification Search
USPC .......................................................... 709/226
See application file for complete search history.

(56) References Cited

U.S. PATENT DOCUMENTS

| | | | | |
|---|---|---|---|---|
| 2012/0289269 | A1* | 11/2012 | Kumagai | H04W 52/0206 455/507 |
| 2014/0341163 | A1* | 11/2014 | Zhang | H04W 74/0833 370/329 |
| 2016/0119816 | A1* | 4/2016 | Yasukawa | H04W 48/20 455/453 |
| 2016/0198464 | A1* | 7/2016 | Yin | H04W 48/20 370/329 |
| 2016/0295490 | A1* | 10/2016 | Eda | H04W 16/32 |

FOREIGN PATENT DOCUMENTS

| | | |
|---|---|---|
| CN | 102577252 A | 7/2012 |
| WO | 2011049770 A2 | 4/2011 |

OTHER PUBLICATIONS

The State Intellectual Property Office of the People's Republic of China (SIPO) Office Action 1 for 201310695508.3 dated May 3, 2018 6 Pages (including translation).

\* cited by examiner

USER SERVICE ACCESS ALLOCATION METHOD AND SYSTEM

CROSS-REFERENCES TO RELATED APPLICATIONS

This application is a continuation of PCT Application No. PCT/CN2014/093876, filed on Dec. 15, 2014, which claims priority of Chinese Patent Application No. 201310695508.3, filed on Dec. 17, 2013. The entire content of the two applications is incorporated herein by reference.

FIELD OF THE DISCLOSURE

The present disclosure generally relates to the field of communication technology and, more particularly, relates to allocation methods and systems for implementing user service access.

BACKGROUND

When a plurality of servers with similar functions provide services to the outside users simultaneously, in order to achieve load balance among these servers, various load balancing algorithms are used to implement the server allocation and access.

The load balancing algorithms used to achieve the server allocation and access are often weighted random algorithms. A traditional weighted random algorithm uses the probability theory to assign small probabilities to servers with large loads, and assign large probabilities to servers with small loads. However, such traditional method often cannot achieve access with the nearest proximity, resulting in poor network quality.

The disclosed methods and systems are directed to solve one or more problems set forth above and other problems.

BRIEF SUMMARY OF THE DISCLOSURE

One aspect of the present disclosure includes a service access allocation method. The method includes providing a plurality of access points for an entire region divided into a plurality of divided areas, where each divided area includes one or more access points. The method also includes, based on the divided areas and a total number of service accessing users corresponding to each divided area, obtaining a weighting coefficient of each divided area. Each divided area has a plurality of service accessing users. Further, the method includes using the weighting coefficient corresponding to each divided area to perform a weighted random calculation to determine one of the plurality access points allocated to a current user to access a service at nearest proximity, such that the current user accesses the allocated access point to obtain the service provided by the allocated access point.

Another aspect of the present disclosure includes a service access allocation system for a plurality of access points for an entire region divided into a plurality of divided areas. The system includes a weighting coefficient obtaining module, a weighting random calculating module, and an accessing module. The weighting coefficient obtaining module is configured to, based on the divided areas and a total number of service accessing users corresponding to each divided area, obtain a weighting coefficient of each divided area, and each divided area has a plurality of service accessing users. The weighting random calculating module is configured to use the weighting coefficient corresponding to each divided area to perform a weighted random calculation to determine one of the plurality access points allocated to a current user to access a service at nearest proximity. Further, the accessing module is configured to access the allocated access point to obtain the service provided by the allocated access point.

Other aspects or embodiments of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
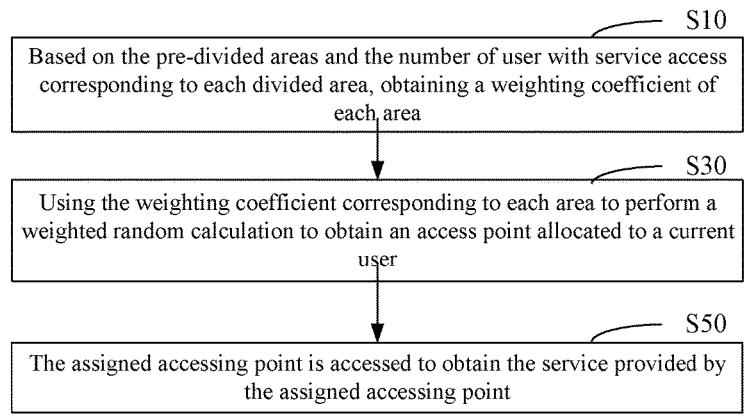
FIG. 1 depicts an exemplary service access allocation process consistent with various disclosed embodiments.

Reference will now be made in detail to exemplary embodiments of the disclosure, which are illustrated in the accompanying drawings. Wherever possible, the same reference numbers will be used throughout the drawings to refer to the same or like parts.

Some terms used in the present disclosure are explained below. The term "load balancing" refers to an allocation algorithm for, when a plurality of servers are used to provide similar functions, balancing load of the plurality of servers, where a server may refer to a physical server or virtual server (e.g., a process or thread on a physical server). The term "weighted random calculation" refers to a load balancing algorithm to assign a smaller allocation probability to a server with a large load and to assign a large allocation probability to a server with a small load. Further, the term "fault tolerance" or "fault recovery" refers to the functionality that keeps continuous usage by the user even when some servers have faults, or that the current conversation of the user may be affected, but the next conversation is not affected.

FIGS. 1-10 depict exemplary allocation methods and systems for implementing service access. FIG. 11 depicts an exemplary operation environment incorporating certain disclosed embodiments. The exemplary methods and apparatus may be implemented, for example, in an exemplary environment shown in FIG. 11.

As shown in FIG. 11, within the operation environment, a user terminal, e.g., portable computer 1110 or mobile terminal 1130, may be used by a user, e.g., user B or user A, to access services provided by access point 1170 (e.g., servers 1170). Access controller 1150 is coupled between the user terminals and the access points/servers to perform server and access allocation.

A user terminal, as used herein, may refer to any appropriate user terminal device with certain computing capabilities including, for example, a personal computer (PC), a work station computer, a notebook computer, a car-carrying computer (e.g., carried in a car or other vehicles), a server computer, a hand-held computing device (e.g., a tablet computer), a mobile terminal (e.g., a mobile phone, a smart phone, an iPad, and/or an aPad), a POS (i.e., point of sale) device, or any other user-side computing device. The user terminal may access the Internet for a variety of services, such as instant message (IM) services, chat services, or social network services, etc., via wired or wireless networks.

A server, such as the access controller 1150, as used herein, may refer one or more server computers configured to provide certain server functionalities including, for example, search engines and database management. A server may also include one or more processors to execute computer programs in parallel. The disclosed service and access allocation methods and systems may be implemented on the access controller 1150. The access controller can run the disclosed allocation methods to achieve the service access for users, e.g., the service access of user A and user B. That is, the modules and units described in relation to FIGS. 1-10 include one or more computer programs stored in a memory of the access controller 1150. When executed by a processor of the access controller 1150, the computer programs perform the functions as described in relation to FIGS. 1-10.

Figure 12:
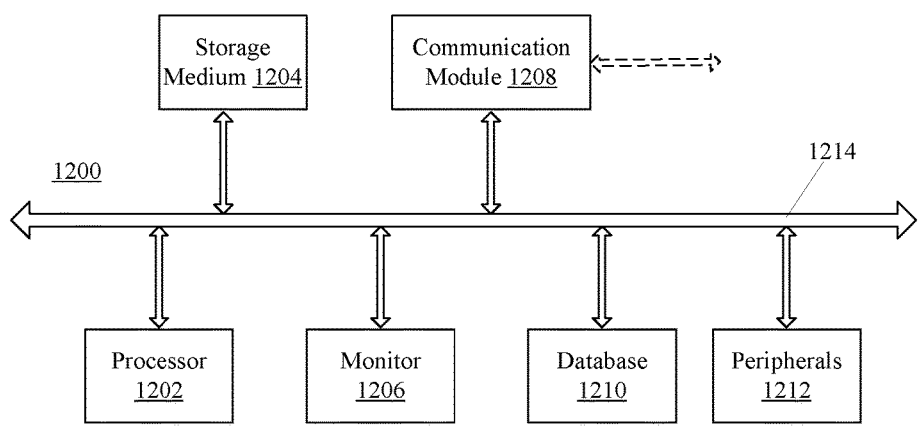
FIG. 12 depicts an exemplary computing system consistent with the disclosed embodiments.

The access controller 1150 and/or the user terminal (portable computer 1110, mobile terminal 1130) may be implemented on any appropriate computing platform. FIG. 12 shows a block diagram of an exemplary computing system 1200 capable of implementing the access controller 1150 and/or the user terminal.

As shown in FIG. 12, the exemplary computer system 1200 may include a processor 1202, a storage medium 1204, a monitor 1206, a communication module 1208, a database 1210, peripherals 1212, and one or more bus 1214 to couple the devices together. Certain devices may be omitted and other devices may be included.

The processor 1202 may include any appropriate processor or processors. Further, the processor 1202 may include multiple cores for multi-thread or parallel processing. The storage medium 1204 may include memory modules, for example, ROM, RAM, and flash memory modules, and mass storages, for example, CD-ROM, U-disk, removable hard disk, etc. The storage medium 1204 may store computer programs for implementing various processes, when executed by the processor 1202.

Further, the peripherals 1212 may include I/O devices, for example, keyboard and mouse, and the communication module 1208 may include network devices for establishing connections through the communication network 1202. The database 1210 may include one or more databases for storing certain data and for performing certain operations on the stored data, for example, webpage browsing, database searching, etc.

FIG. 1 depicts an exemplary service access allocation process consistent with various disclosed embodiments. As shown in FIG. 1, the allocation process may include the following steps.

In Step S10, based on the pre-divided areas and the number of user with service access corresponding to each divided area, a weighting coefficient of each area may be obtained.

For example, a plurality of access points for a service region may be provided, and the access points may provide or be able to provide a service to users. That is, a particular user may access any one access point for the service provided. The service region may be divided into a plurality of divided areas, and each divided area may include one or more access points.

The pre-divided areas may be obtained by dividing in advance the geographical region of the user for service access. For example, the region may be divided into multiple areas by according to the administrative areas or other criteria. Each divided area may have a corresponding weighting coefficient.

Each area includes certain number of users with service access. The service may include providing network application service to the users. The network application service may include network application platforms or various services provided by network application programs, such as group video show, multiplayer video, etc. The number of service accessing users corresponding to each area is obtained. The weighting coefficient corresponding to each area can be obtained based on the number of service accessing users in each area. The weighting coefficient is configured to control the probability for the user to access an access point in the corresponding area.

In Step S30, using the weighting coefficient corresponding to each area to perform a weighted random calculation to obtain an access point allocated to a current user. Because the weighting coefficient corresponding to the area is determined based on the number of service accessing users in the area, the allocation of the access point reflects the number of service accessing users in the area fully. Thus, a desired access point allocation may be achieved.

Each area has one or more than one corresponding access points. The number of the corresponding access points is determined by the number of service accessing users in the area. When the number of service accessing users corresponding to an area is high and the area has several corresponding access points, the weighting coefficient of the area may be set to a large value. Because the service accessing users in the area may compose a large portion of all service accessing users, the probability of service accessing user in the area access corresponding access point in the area is high by setting the weighting coefficient to a large value. Thus, the access at nearest proximity is achieved, the network quality is improved, and the error rate and transmission delay are reduced.

In Step S50, the allocated access point is accessed to obtain services provided by the allocated access point. The access points may be servers that provide services to the outside, or may be processes or threads in servers that provide services to the outside. After allocated access point is obtained by weighted random calculation, the allocated access point is accessed to obtain services provided by the allocated access point. Because the access point is at the nearest proximity of service accessing users, the allocated access point may provide smooth services to the user.

Figure 2:
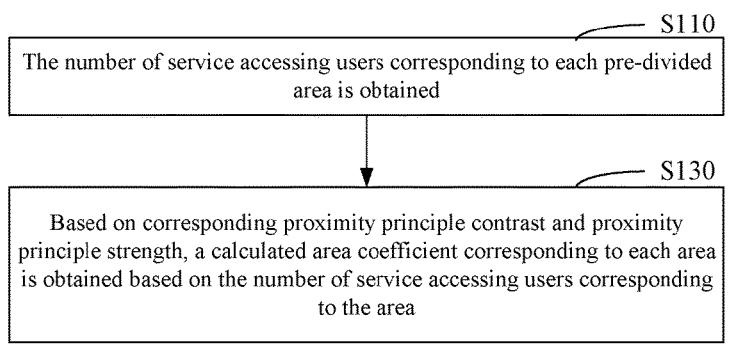
FIG. 2 depicts certain exemplary service access allocation process steps consistent with various disclosed embodiments.

FIG. 2 depicts certain exemplary allocation service access process consistent with various disclosed embodiments. As shown in FIG. 2, Step S10 may include the following steps.

In Step S110, the number of service accessing users corresponding to each pre-divided area is obtained. For example, a cluster providing services to users includes a plurality of access points. Each access point corresponds to an area, i.e., within the area. When the access point provides services to the user in the area, the access is obtained from the nearest proximity to the user. Thus, the provided network quality is high.

For example, areas corresponding to access points in a cluster are divided by administrative areas. All access points corresponding to an area are located within the area. For instance, areas corresponding to access points in a cluster may be divided into Guangdong province, Beijing, Shanghai, Chengdu, etc. The number of service accessing users in Guangdong province is 2000, the number of service accessing users in Beijing is 100, the number of service accessing users in Shanghai is 20, and the number of service accessing users in Changdu is 1, and so on.

In Step S130, based on corresponding proximity principle contrast and proximity principle strength, a calculated area coefficient corresponding to each area is obtained based on the number of service accessing users corresponding to the area. The area coefficient corresponding to each area may be the weighting coefficient corresponding to each area.

The calculated area coefficient is obtained based on the number of service accessing users, i.e., the weighting coefficient used in weighted random calculation. Specifically, the proximity principle contrast and the proximity principle intensity are numbers greater than 1 respectively. The proximity principle contrast and the proximity principle intensity for each area may be a unique value. Or a plurality of areas may correspond to a same proximity principle contrast and a same proximity principle intensity, and these areas may be several areas with the highest numbers of service accessing users. Thus, the access at nearest proximity is achieved for service accessing users and the calculation of area coefficient is simplified. In addition, when the number of service users in an area is 1 or a relatively small value, the corresponding area coefficient may be set as 1, so as to save computational resources.

Specifically, when the proximity principle contrast is M, and the proximity principle intensity is N, the number of service accessing users of the area may be raised to the power of M and then multiplied by N to obtain the corresponding area coefficient of the area. For example, assume the proximity principle contrast M=1.2, the proximity principle intensity N=1000, then the area coefficient of each area may be calculated by the number of service accessing users corresponding to each area. The area coefficient of Guangdong Province is 9146101 ($2000^{1.2} \times 1000$), the area coefficient of Beijing is 251188 ($100^{1.2} \times 1000$), the area coefficient of Shanghai is 36411($20^{1.2} \times 1000$), and the area coefficient of Chengdu is 1000 ($1^{1.2} \times 1000$).

Returning to FIG. 1, in one embodiment, before the Step S30, the allocation process may further include obtaining a preset number of areas with highest numbers of service accessing users.

To simplify the calculation and to improve the processing efficiency, only a plurality of areas with the highest number of service accessing users are included in the calculation of area coefficient. Specifically, areas are sorted by the number of service accessing users from high to low, and then a preset number of numbers of service accessing users are obtained in descending order, and the corresponding areas are also obtained. Accordingly, the calculated area coefficient is the weighting coefficient corresponding to each of the preset number of areas with highest numbers of service accessing users, i.e., only these areas are included in area coefficient calculation. The other areas may use a default value for minimum access.

Figure 3:
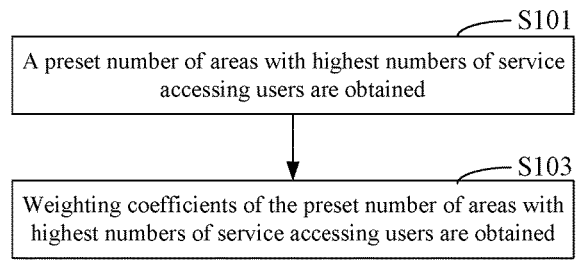
FIG. 3 depicts certain exemplary service access allocation process steps consistent with various disclosed embodiments.

FIG. 3 depicts certain exemplary service access allocation process consistent with various disclosed embodiments. As shown in FIG. 3, Step S10 may include the following steps.

In Step S101, a predetermined number of areas with highest numbers of service accessing users are obtained.

In Step S103, weighting coefficients of the predetermined number of areas with highest numbers of service accessing users are obtained.

Because the weighting coefficients corresponding to areas with the highest numbers of service accessing users are ensured to be a relatively large number, the probability for the user to access an access point at the nearest proximity of the corresponding area is improved. Thus, weighting coefficients for a number of areas with the highest numbers of service accessing users may be set directly. The weighting coefficient can be a relatively large value. Thus, the weighting coefficient corresponding to the area is obtained by direct assignment without calculation, so that the method is simplified and the access at nearest proximity can be achieved.

Figure 4:
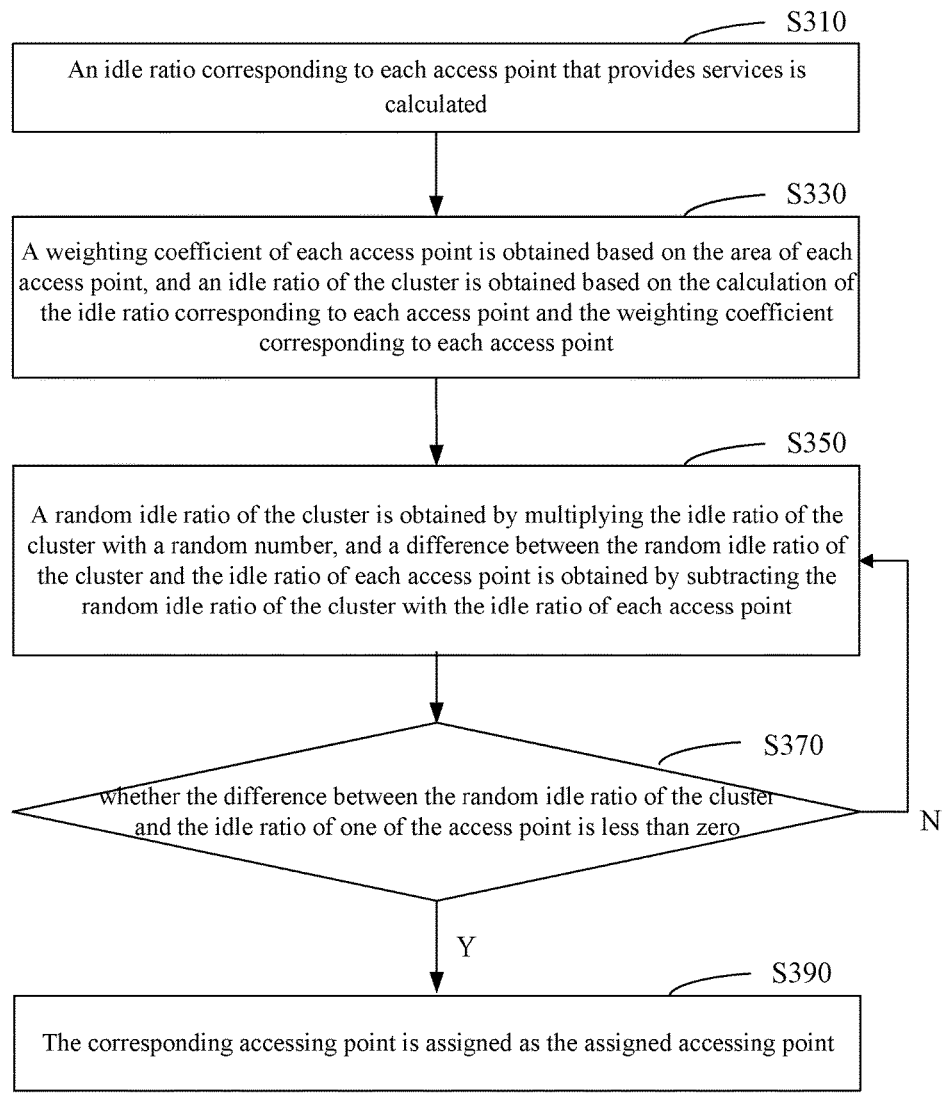
FIG. 4 depicts certain exemplary service access allocation process steps consistent with various disclosed embodiments.

FIG. 4 depicts certain exemplary service access allocation process consistent with various disclosed embodiments. As shown in FIG. 4, Step S30 may include the following steps.

In Step S310, an idle ratio corresponding to each access point that provides services is calculated. The idle ratio is configured to indicate the degree of idleness of an access point. The idle ratio is a quotient between a difference value and the maximum load of the access point, and the difference value is the difference between the maximum load and the current load. The idle ratio is a number between 0.01 and 1.0, and the higher of the idle ratio, the higher of the probability for the corresponding access point to accept users and to provide services to users.

In Step S330, a weighting coefficient of each access point is obtained based on the area of each access point, and an idle ratio of the cluster is obtained based on the calculation of the idle ratio corresponding to each access point and the weighting coefficient corresponding to each access point.

The idle ratio of the cluster is calculated based on the idle ratio corresponding to each access point and the weighting coefficient corresponding to each access point. Specifically, the weighting idle ratio may be the product of the idle ratio and the weighting coefficient corresponding to each access point. The idle ratio of a cluster may be obtained by the summation of the weighting idle ratios corresponding to all access points.

Specifically, the weighting coefficient may be calculated from the proximity principle contrast, the proximity principle intensity and the number of service accessing users, or may be a preset value, or may be an assigned value. For example, the weighting coefficient of an area with a high number of service accessing users may be assigned with a relative high value. And the weighting coefficient of an area with a low number of service accessing users may be assigned with 1 or a relative low value.

In Step S350, a random idle ratio of the cluster is obtained by multiplying the idle ratio of the cluster with a random number, and a difference between the random idle ratio of the cluster and the idle ratio of each access point is obtained by subtracting the random idle ratio of the cluster with the idle ratio of each access point. A random number is a random number between [0.0, 1.0).

Further, the random idle ratio is subtracted with the idle ratio of another access point, and the subtraction is repeated until the difference after subtraction becomes a value less than zero. At this point, the access point corresponding to the idle ratio is assigned as the allocated access point.

In Step S370, whether the difference between the random idle ratio of the cluster and the idle ratio of one of the access point is less than zero is determined. When the difference is less than zero, Step S390 is performed. When the difference is not less than zero, the process continues from Step S350.

Thus, the random idle ratio is subtracted sequentially by the idle ratio of each access point, and whether the obtained difference is less than zero is determined. When the difference is less than zero, Step S390 is performed. When the difference is not less than zero, Step S350 is repeated, and the obtained difference is subtracted with one of the next access point. Whether the obtained difference is less than zero is determined again. When the difference is not less than zero, Step S350 is again repeated. When the difference is less than zero, Step S390 is performed to obtain an allocated access point.

In Step S390, the corresponding access point is assigned as the allocated access point.

Figure 5:
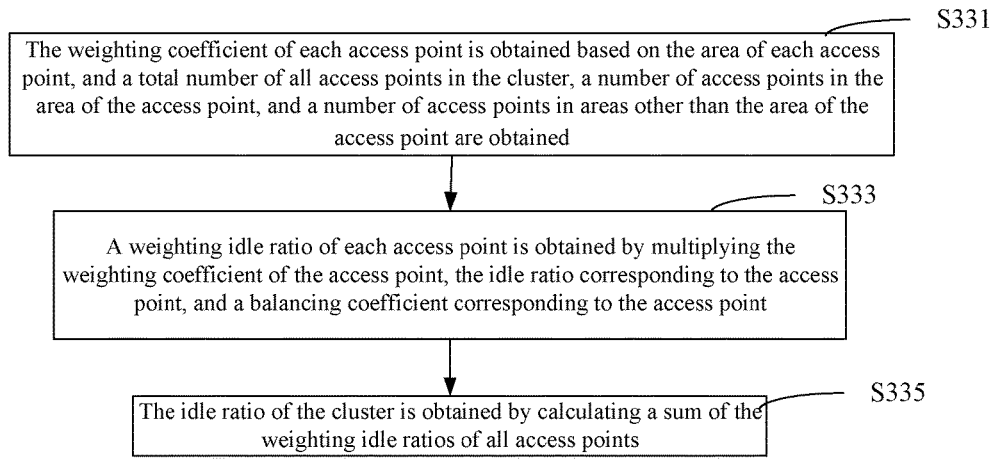
FIG. 5 depicts certain exemplary service access allocation process steps consistent with various disclosed embodiments.

FIG. 5 depicts certain exemplary service access allocation process consistent with various disclosed embodiments. As shown in FIG. 5, Step S330 may include the following steps.

In Step S331, the weighting coefficient of each access point is obtained based on the area of each access point, and a total number of all access points in the cluster, a number of access points in the area of the access point, and a number of access points in areas other than the area of the access point are obtained.

In Step S333, a weighting idle ratio of each access point is obtained by multiplying the weighting coefficient of the access point, the idle ratio corresponding to the access point, and a balancing coefficient corresponding to the access point. The balancing coefficient corresponding to the access point is based on the total number of all access points in the cluster, the number of access points in the area of the access point, and the number of the access points in areas other than the area of the access point.

The balancing coefficient is configured to prevent the probability of the access point in the area for access at nearest proximity from being affected by the uneven distribution of the access points in the different areas. Specifically, the balancing coefficient is a ratio between the number of access points in areas other than the area of the access point and the number of access points of the area. Through the balancing coefficient, the accuracy of the assignment of access points is ensured.

In Step S335, the idle ratio of the cluster is obtained by calculating a sum of the weighting idle ratios of all access points.

Figure 6:
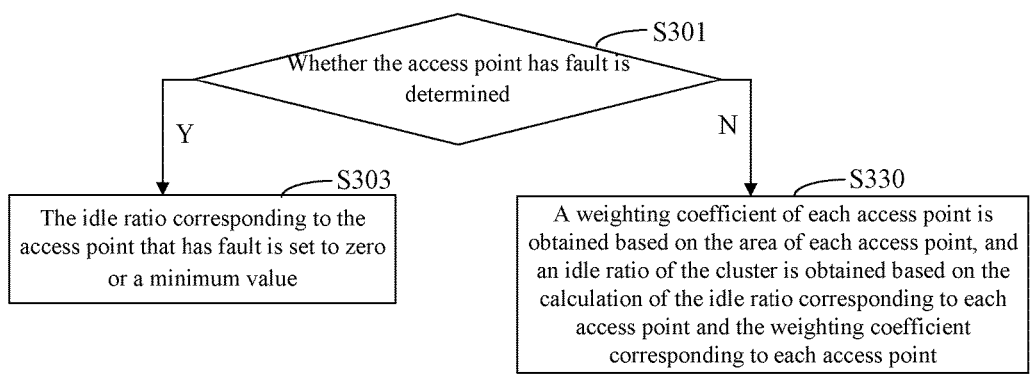
FIG. 6 depicts certain exemplary service access allocation process steps consistent with various disclosed embodiments.

FIG. 6 depicts certain exemplary service access allocation process consistent with various disclosed embodiments. As shown in FIG. 6, Step S30 may include the following steps.

In Step S301, whether the access point has fault is determined. When the access point has fault, Step S303 is performed. When the access point does not have fault, Step S330 is performed.

When an access point is assigned to the user, if the access point has fault, the access point may be unable to provide services, then Step S303 is performed to set the idle ratio of corresponding faulty access point to zero or a minimum value to prevent a faulty access point is assigned to the user.

In Step S303, the idle ratio corresponding to the access point that has fault is set to zero or a minimum value. Whether the idle ratio of corresponding faulty access point is set to zero or set to a minimum value, the assignment of faulty access point to a user can be prevented. However, when the idle ratio of corresponding faulty access point is set to a minimum value, the faulty access point still has a minimum probability to be assigned to a user, i.e., a minimum number of users may still tried to get access to the faulty access point. Thus, when the faulty access point is recovered, the services provided by the access point may be resumed automatically, i.e. during the fault recovery or fault tolerance, the automation operation is also improved. When some access points have fault, users are not affected to receive service. In one embodiment, the probability is 0.001.

Thus, the area with high number of service accessing users has higher probability for the users to access the access points at nearest proximity from the same area. Thus, the access at nearest proximity is achieved.

Figure 7:
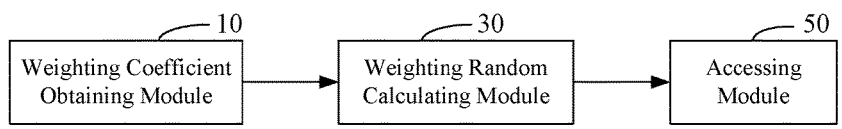
FIG. 7 depicts an exemplary service access allocation system consistent with various disclosed embodiments.

FIG. 7 depicts an exemplary service access allocation system consistent with various disclosed embodiments. As shown in FIG. 7, the system includes a weighting coefficient obtaining module 10, a weighting random calculating module 30, and an accessing module 50.

The weighting coefficient obtaining module 10 is configured to, based on the pre-divided areas and the number of user with service access corresponding to each divided area, obtain a weighting coefficient of each area. The pre-divided areas may be obtained by dividing in advance the geographical region of the user for service access. For example, the region may be divided into multiple areas by according to the administrative areas or other criteria. Each divided area may have a corresponding weighting coefficient.

Each area includes certain number of users with service access. The service may include providing network application service to the users. The network application service may include network application platforms or various services provided by network application programs, such as group video show, multiplayer video, etc. The number of service accessing users corresponding to each area is obtained. The weighting coefficient corresponding to each area can be obtained based on the number of service accessing users in each area. The weighting coefficient is configured to control the probability for the user to access an access point in the corresponding area.

The weighting random calculating module 30 is configured to use the weighting coefficient corresponding to each area to perform a weighted random calculation to obtain an access point allocated to a current user. Each pre-divided area includes a plurality of access points. Because the weighting coefficient corresponding to the area is determined based on the number of service accessing users in the area, the allocation of the access point reflects the number of service accessing users in the area fully. Thus, a desired access point allocation may be achieved.

Each area has one or more than one corresponding access points. The number of the corresponding access points is determined by the number of service accessing users in the area. When the number of service accessing users corresponding to an area is high and the area has several corresponding access points, the weighting coefficient of the area may be set to a large value. Because the service accessing users in the area may compose a large portion of all service accessing users, the weighting random calculating module 30 sets the weighting coefficient to a large value such that the probability of service accessing user in the area access corresponding access point in the area is high. Thus, the access at nearest proximity is achieved, the network quality is improved, and the error rate and transmission delay are reduced.

The accessing module 50 is configured to access the allocated access point to obtain services provided by the allocated access point. The access points may be servers that provide services to the outside, or may be processes or threads in servers that provide services to the outside. After allocated access point is obtained by weighted random calculation, the accessing module 50 assigns the user to the allocated access point to obtain services provided by the allocated access point. Because the access point is at the nearest proximity of service accessing users, the allocated access point may provide smooth service to the user.

Figure 8:
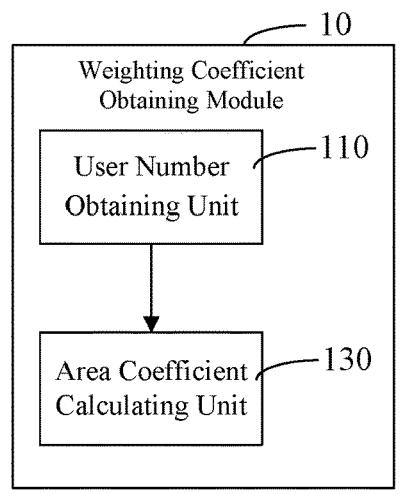
FIG. 8 depicts certain exemplary service access allocation module consistent with various disclosed embodiments.

FIG. 8 depicts an exemplary weighting coefficient obtaining module 10. As shown in FIG. 8, the weighting coefficient obtaining module 10 includes a user number obtaining unit 110 and an area coefficient calculating unit 130.

The user number obtaining unit 110 is configured to obtain the number of service accessing users corresponding to each pre-divided area. The user number obtaining unit 110 obtains the number of service accessing users corresponding to each pre-divided area. For example, a cluster providing services to users includes a plurality of access points. Each access point corresponds to an area, or within an area. When the access point provides services to the user in the area, the access is obtained from the nearest proximity to the user. Thus, the quality of the provided network is high.

Specifically, areas corresponding to access points in a cluster are divided by administrative areas. All access points corresponding to an area are located within the area. For instance, areas corresponding to access points in a cluster may be divided into Guangdong province, Beijing, Shanghai, Chengdu, etc. The number of service accessing users in Guangdong province is 2000, the number of service accessing users in Beijing is 100, the number of service accessing users in Shanghai is 20, and the number of service accessing users in Changdu is 1, and so on.

The area coefficient calculating unit 130 is configured, based on corresponding proximity principle contrast and proximity principle strength, obtain a calculated area coefficient corresponding to each area is obtained based on the number of service accessing users corresponding to the area. The area coefficient corresponding to each area is the weighting coefficient corresponding to each area.

The area coefficient calculating unit 130 obtains the calculated area coefficient based on the number of service accessing users, i.e., the weighting coefficient used in weighted random calculation. Specifically, the proximity principle contrast and the proximity principle intensity are numbers greater than 1 respectively. The proximity principle contrast and the proximity principle intensity for each area may be a unique value. Or a plurality of areas may correspond to a same proximity principle contrast and a same proximity principle intensity. These areas may be several areas with the highest numbers of service accessing users. Thus, the access at nearest proximity is achieved for service accessing users and the calculation of area coefficient is simplified. In addition, when the number of service users in an area is 1 or a relatively small value, the corresponding area coefficient may be set as 1, so as to save computational resources.

Specifically, when the proximity principle contrast is M, and the proximity principle intensity is N, the number of service accessing users of the area may be raised to the power of M and then multiplied by N to obtain the corresponding area coefficient of the area. For example, assume the proximity principle contrast M=1.2, the proximity principle intensity N=1000, then the area coefficient of each area may be calculated by the number of service accessing users corresponding to each area. The area coefficient of Guangdong Province is 9146101 ($2000^{1.2} \times 1000$), the area coefficient of Beijing is 251188 ($100^{1.2} \times 1000$), the area coefficient of Shanghai is 36411 ($20^{1.2} \times 1000$), and the area coefficient of Chengdu is 1000 ($1^{1.2} \times 1000$).

In another embodiment, the system may further include an area obtaining module (not shown). The area obtaining module is configured to obtain a predetermined number of areas with highest numbers of service accessing users. In order to simplify the calculation and to improve the processing efficiency, only a plurality of areas with the highest number of service accessing users is included in the calculation of area coefficient. Specifically, the area obtaining module may sort areas by the number of service accessing users from high to low, and then a predetermined number of numbers of service accessing users are obtained in descending order, and the corresponding areas are obtained further. Accordingly, the calculated area coefficient is the weighting coefficient corresponding to each of the preset number of areas with highest numbers of service accessing users, i.e., only these areas are included in area coefficient calculation.

In another embodiment, the weighting coefficient obtaining module 10 may be configured to obtain a predetermined number of areas with highest numbers of service accessing users are obtained, and to obtain weighting coefficients of the predetermined number of areas with highest numbers of service accessing users.

Because the weighting coefficients corresponding to areas with the highest numbers of service accessing users are ensured to be a relatively large number, the probability for the user to access an access point in the nearest proximity of the corresponding to the area is improved. Thus, the weighting coefficient obtaining module 10 may set the weighting coefficients for a set number of areas with the highest numbers of service accessing users directly. The weighting coefficient is a relatively large value. Thus, the weighting coefficient corresponding to the area is obtained by direct assignment, so that the method is simplified and the access at nearest proximity is achieved.

Figure 9:
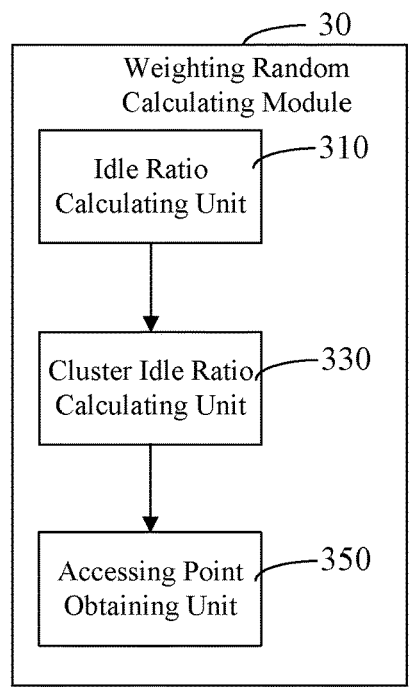
FIG. 9 depicts certain exemplary service access allocation module consistent with various disclosed embodiments.

FIG. 9 depicts an exemplary weighting random calculating module 30. As shown in FIG. 9, the weighting random calculating module 30 includes an idle ratio calculating unit 310, a cluster idle ratio calculating unit 330, and an access point obtaining unit 350.

The idle ratio calculating unit 310 is configured to calculate an idle ratio corresponding to each access point that provides services. The idle ratio is configured to indicate the degree of idleness of an access point. The idle ratio is a quotient between a difference value and the maximum load of the access point, and the difference value is the difference between the maximum load and the current load. The idle ratio is a number between 0.01 and 1.0, and the higher of the idle ratio, the higher of the probability for the corresponding access point to accept users and to provide services to users.

The cluster idle ratio calculating unit 330 is configured to obtain a weighting coefficient of each access point based on the area of each access point, and to obtain an idle ratio of the cluster based on the calculation of the idle ratio corresponding to each access point and the weighting coefficient corresponding to each access point;

The cluster idle ratio calculating unit 330 calculates the idle ratio of the cluster based on the idle ratio corresponding to each access point and the weighting coefficient corresponding to each access point. Specifically, the cluster idle ratio calculating unit 330 may set the product of the idle ratio and the weighting coefficient corresponding to each access point as the weighting idle ratio. The idle ratio of a cluster may be obtained by the summation of the weighting idle ratios corresponding to all access points. Specifically, the weighting coefficient may be calculated from the proximity principle contrast, the proximity principle intensity and the number of service accessing users, or may be a preset value, or may be an assigned value. For example, the weighting coefficient of an area with a high number of service accessing users may be assigned with a relative high value. And the weighting coefficient of an area with a low number of service accessing users may be assigned with 1 or a relative low value.

The access point obtaining unit 350 is configured to obtain a random idle ratio of the cluster by multiplying the idle ratio of the cluster with a random number, to obtain a difference between the random idle ratio of the cluster and the idle ratio of each access point by subtracting the random idle ratio of the cluster with the idle ratio of each access point, to determine whether the difference between the random idle ratio of the cluster and the idle ratio of each access point is less than zero, when the difference is not less than zero, subtract the difference with the idle ratio of one of the next access point, and when the difference for an access point is less than zero, to assign the corresponding access point as the allocated access point.

A random number is a random number between [0.0, 1.0). Further, the random idle ratio is subtracted with the idle ratio of another access point, and the subtraction is repeated until the difference after subtraction becomes a value less than zero. At this point, the access point corresponding to the idle ratio is assigned as the allocated access point.

The random idle ratio is subtracted with the idle ratio of one of the access point. Whether the obtained difference is less than zero is determined. When the difference is less than zero, the allocated access point is obtained. When the difference is not less than zero, the obtained difference is subtracted with a next access point. Whether the obtained difference is less than zero is determined again. When the difference is not less than zero, the difference calculation is performed again. When the difference is less than zero, the allocated access point is obtained.

Figure 10:
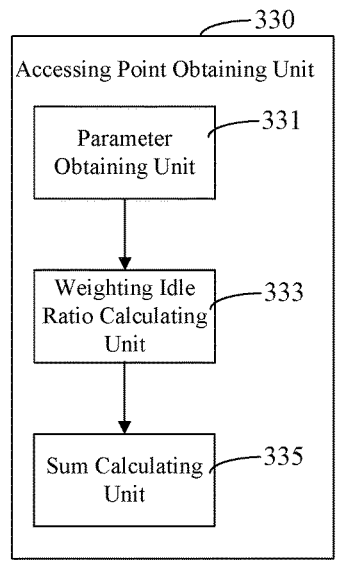
FIG. 10 depicts certain exemplary service access allocation module consistent with various disclosed embodiments.
Figure 11:
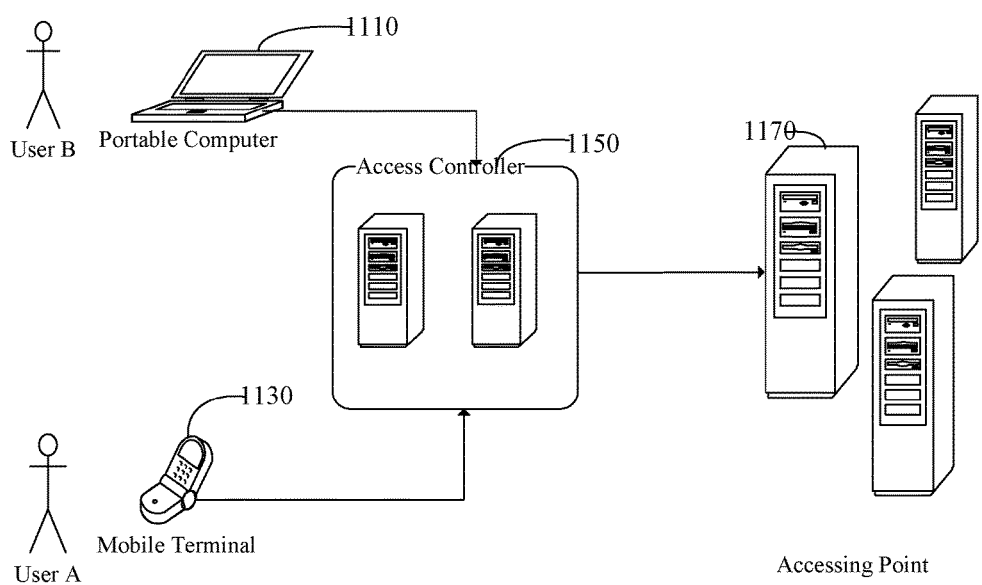
FIG. 11 depicts an exemplary environment incorporating certain disclosed embodiments.

FIG. 10 depicts an exemplary cluster idle ratio calculating unit 330. As shown in FIG. 10, the cluster idle ratio calculating unit 330 may include a parameter obtaining unit 331, a weighting idle ratio calculating unit 333, and a sum calculating unit 335.

The parameter obtaining unit 331 is configured to obtain the weighting coefficient of each access point based on the area of each access point, and to obtain a total number of all access points in the cluster, a number of access points in the area of the access point, and a number of access points in areas other than the area of the access point.

The weighting idle ratio calculating unit 333 is configured to obtain a weighting idle ratio of each access point by multiplying the weighting coefficient of the access point, the idle ratio corresponding to the access point, and a balancing coefficient corresponding to the access point, wherein the balancing coefficient corresponding to the access point is based on the total number of all access points in the cluster, the number of access points in the area of the access point, and the number of the access points in areas other than the area of the access point.

The balancing coefficient is configured to prevent the probability of the access point in the area for access at nearest proximity from being affected by the uneven distribution of the access points in the different areas. Specifically, the balancing coefficient is a ratio between the number of access points in areas other than the area of the access point and the number of access points of the area. Through the balancing coefficient, the accuracy of the assignment of access points is ensured.

The sum calculating unit 335 is configured to obtain the idle ratio of the cluster by calculating a sum of the weighting idle ratios of all access points.

In another embodiment, the weighting random calculating module 30 may include a fault handling unit (not shown). The fault handling unit is configured to determine whether the access point has fault, and when the access point has fault, to set the idle ratio corresponding to the access point that has fault as zero or a minimum value, and when the access point does not have fault, to inform the cluster idle ratio calculating unit 330.

When an access point is assigned to the user, if the access point has fault, the access point may not provide services, then the fault handling unit may set the idle ratio of corresponding faulty access point as zero or a minimum value to prevent a faulty access point is assigned to the user.

Whether the idle ratio of corresponding faulty access point is set to zero or set to a minimum value, the assignment of faulty access point to a user can be prevented. However, when the idle ratio of corresponding faulty access point is set to a minimum value, the faulty access point still has a minimum probability to be assigned to a user, i.e., a minimum number of users may still tried to get access to the faulty access point. Thus, when the faulty access point is recovered, the services provided by the access point may be resumed automatically, i.e. during the fault recovery or fault tolerance, the automation operation is also improved. When some access points have fault, users are not affected to receive service. In one embodiment, the probability is 0.001.

It should be noted that, in the present disclosure each embodiment is progressively described, i.e., each embodiment is described and focused on difference between embodiments. Similar and/or the same portions between various embodiments may be referred to with each other. In addition, exemplary systems are described with respect to corresponding methods.

The disclosed methods, and/or systems may be implemented in a suitable computing environment. The disclosure may be described with reference to symbol(s) and step(s) performed by one or more computers, unless otherwise specified. Therefore, steps and/or implementations described herein may be described for one or more times and executed by computer(s). As used herein, the term "executed by computer(s)" includes an execution of a computer processing unit on electronic signals of data in a structured type. Such execution may convert data or maintain the data in a position in a memory system (or storage device) of the computer, which may be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

A person of ordinary skill in the art may understand that the modules included herein are described according to their functional logic, but are not limited to the above descriptions as long as the modules may implement corresponding functions. Further, the specific name of each functional module is used for distinguishing from on another without limiting the protection scope of the present disclosure.

As used herein, the term "module" may be software objects executed on a computing system. A variety of components described herein including elements, modules, units, engines, and services may be executed in the computing system. The methods and/or systems may be implemented in a software manner. Of course, the methods and/or systems may be implemented using hardware. All of which are within the scope of the present disclosure.

In various embodiments, the disclosed modules may be configured in one apparatus (e.g., a processing unit) or configured in multiple apparatus as desired. The modules disclosed herein may be integrated in one module or in multiple modules. Each of the modules disclosed herein may be divided into one or more sub-modules, which may be recombined in any manner.

One of ordinary skill in the art would appreciate that suitable software and/or hardware (e.g., a universal hardware platform) may be included and used in the disclosed methods and systems. For example, the disclosed embodiments may be implemented by hardware only, which alternatively may be implemented by software products only. The software products may be stored in a computer-readable storage medium including, e.g., ROM/RAM, magnetic disk, optical disk, etc. The software products may include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a . . . " does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments may be obvious to those skilled in the art and may be included in this disclosure.

By using the disclosed service access allocation methods and systems, a service region can be pre-divided into a plurality of areas, and each area has one or more than one corresponding access points. The number of the corresponding access points is determined by the number of service accessing users in the area. When the number of service accessing users corresponding to an area is high and the area has several corresponding access points, the weighting coefficient of the area may be set to a large value. Because the service accessing users in the area may compose a large portion of all service accessing users, the probability of service accessing user in the area access corresponding access point in the area is high by setting the weighting coefficient to a large value. Thus, the access at nearest proximity is achieved, the network quality is improved, and the error rate and transmission delay are reduced.

What is claimed is:

1. A service access allocation method, comprising:
providing a plurality of access points for an entire region divided into a plurality of divided areas, each divided area includes one or more access points;
based on the divided areas and a total number of service accessing users corresponding to each divided area, obtaining a weighting coefficient of each divided area, wherein the each divided area has a plurality of service accessing users; and
using the weighting coefficient corresponding to each divided area to perform a weighted random calculation to determine one of the plurality access points allocated to a current user to access a service at nearest proximity, such that the current user accesses the allocated access point to obtain the service provided by the allocated access point;
wherein the obtaining the weighting coefficient corresponding to each divided area further comprises:
obtaining the total number of service accessing users corresponding to each divided area;
based on the total number of service accessing users, calculating an area coefficient corresponding to each divided area using a proximity principle contrast and a proximity principle intensity, the area coefficient having a positive correlation with the total number of service accessing users, the proximity principle contrast, and the proximity principle intensity; and
designating the calculated area coefficient corresponding to each divided area as the weighting coefficient corresponding to each divided area.

2. The method according to claim 1, wherein the calculating an area coefficient corresponding to each divided area further comprises:
obtaining a predetermined number of divided areas with highest numbers of service accessing users; and
only calculating the area coefficient for each of the predetermined number of divided areas with highest numbers of service accessing users to be designated as the weighting coefficient corresponding to each of the preset number of areas with highest numbers of service accessing users.

3. The method according to claim 1, wherein the calculating an area coefficient corresponding to each divided area further comprises:
provided that M represents the proximity principle contrast, N represents the proximity principle intensity, and U represents the number of service accessing users of a divided area, calculating the area coefficient corresponding to the divided area as $U^M \times N$.

4. The method according to claim 1, wherein the using the weighting coefficient corresponding to each divided area to perform a weighted random calculation to determine one of the plurality access points allocated to a current user for access at nearest proximity further comprise:
calculating an idle ratio corresponding to each access point providing the service;
obtaining a weighting coefficient of each access point based on the divided area of each access point;
based on the weighting coefficient and the idle ratio of each access point, obtaining a cluster idle ratio for all access points providing the service;

obtaining a cluster random idle ratio by multiplying the cluster idle ratio with a random number;

obtaining a difference value between the cluster random idle ratio and the idle ratio of one of the access points by subtracting from the cluster random idle ratio with the idle ratio of the one of the access points;

determining whether the difference value between the cluster random idle ratio and the idle ratio of the one of the access points is less than zero; and when the difference value is less than zero, assigning the one of the access points as the allocated access point.

5. The method according to claim 4, wherein the obtaining the weighting coefficient of each access point based on the divided area of each access point and obtaining a cluster idle ratio for all access points providing the service further comprises:

obtaining the weighting coefficient of each access point based on the divided area of each access point;

obtaining a total number of all access points, a total number of access points in the divided area of the each access point, and a total number of access points in areas other than the divided area of the access point;

obtaining a weighting idle ratio of each access point by multiplying the weighting coefficient of the access point, the idle ratio corresponding to the access point, and a balancing coefficient corresponding to the access point, wherein the balancing coefficient is determined based on the total number of all access points, the number of access points in the divided area of the access point, and the number of the access points in areas other than the area of the access point; and obtaining the cluster idle ratio by adding up the weighting idle ratios of each access point.

6. The method according to claim 4, wherein calculating an idle ratio corresponding to each access point providing a service further comprises:

determining whether the access point has fault; and when it is determined that the access point has fault, setting the idle ratio corresponding to the access point to zero or a minimum value.

7. A service access allocation system for a plurality of access points for an entire region divided into a plurality of divided areas, comprising:

a memory; and a processor configured to:

based on the divided areas and a total number of service accessing users corresponding to each divided area, obtain a weighting coefficient of each divided area, wherein the each divided area has a plurality of service accessing users;

use the weighting coefficient corresponding to each divided area to perform a weighted random calculation to determine one of the plurality access points allocated to a current user to access a service at nearest proximity; and access the allocated access point to obtain the service provided by the allocated access point;

wherein the processor is further configured to:

obtain the total number of service accessing users corresponding to each divided area;

based on the total number of service accessing users, calculate an area coefficient corresponding to each divided area using a proximity principle contrast and a proximity principle intensity, the area coefficient having a positive correlation with the total number of service accessing users, the proximity principle contrast, and the proximity principle intensity; and designate the calculated area coefficient corresponding to each divided area as the weighting coefficient corresponding to each divided area.

8. The system according to claim 7, wherein the processor is further configured to:

obtain a predetermined number of divided areas with highest numbers of service accessing users; and only calculate the area coefficient for each of the predetermined number of divided areas with highest numbers of service accessing users to be designated as the weighting coefficient corresponding to each of the preset number of areas with highest numbers of service accessing users.

9. The system according to claim 7, wherein the processor is further configured to:

provided that M represents the proximity principle contrast, N represents the proximity principle intensity, and U represents the number of service accessing users of a divided area, calculate the area coefficient corresponding to the divided area as $U^M \times N$.

10. The system according to claim 7, wherein the processor is further configured to:

calculate an idle ratio corresponding to each access point providing the service;

obtain a weighting coefficient of each access point based on the divided area of each access point and, based on the weighting coefficient and the idle ratio of each access point, to obtain a cluster idle ratio for all access points providing the service;

obtain a cluster random idle ratio by multiplying the cluster idle ratio with a random number;

obtain a difference value between the cluster random idle ratio and the idle ratio of one of the access points by subtracting from the cluster random idle ratio with the idle ratio of the one of the access points;

determine whether the difference value between the cluster random idle ratio and the idle ratio of the one of the access points is less than zero; and when the difference value is less than zero, assign the one of the access points as the allocated access point.

11. The system according to claim 10, wherein the processor is further configured to:

obtain the weighting coefficient of each access point based on the divided area of each access point and to obtain a total number of all access points, a total number of access points in the divided area of the each access point, and a total number of access points in areas other than the divided area of the access point;

obtain a weighting idle ratio of each access point by multiplying the weighting coefficient of the access point, the idle ratio corresponding to the access point, and a balancing coefficient corresponding to the access point, wherein the balancing coefficient is determined based on the total number of all access points, the number of access points in the divided area of the access point, and the number of the access points in areas other than the area of the access point; and obtain the cluster idle ratio by adding up the weighting idle ratios of each access point.

12. The system according to claim 10, wherein the processor is further configured to:

determine whether the access point has fault and, when it is determined that the access point has fault, the idle ratio corresponding to the access point to zero or a minimum value.

13. A non-transitory storage medium storing computer readable instructions that, when being executed by at least one processor, cause the at least one processor to perform:
providing a plurality of access points for an entire region divided into a plurality of divided areas, each divided area includes one or more access points;
based on the divided areas and a total number of service accessing users corresponding to each divided area, obtaining a weighting coefficient of each divided area, wherein the each divided area has a plurality of service accessing users; and
using the weighting coefficient corresponding to each divided area to perform a weighted random calculation to determine one of the plurality access points allocated to a current user to access a service at nearest proximity, such that the current user accesses the allocated access point to obtain the service provided by the allocated access point;
wherein the obtaining the weighting coefficient corresponding to each divided area comprises:
obtaining the total number of service accessing users corresponding to each divided area;
based on the total number of service accessing users, calculating an area coefficient corresponding to each divided area using a proximity principle contrast and a proximity principle intensity, the area coefficient having a positive correlation with the total number of service accessing users, the proximity principle contrast, and the proximity principle intensity; and
designating the calculated area coefficient corresponding to each divided area as the weighting coefficient corresponding to each divided area.

14. The non-transitory storage medium according to claim 13, wherein the calculating an area coefficient corresponding to each divided area further comprises:
obtaining a predetermined number of divided areas with highest numbers of service accessing users; and
only calculating the area coefficient for each of the predetermined number of divided areas with highest numbers of service accessing users to be designated as the weighting coefficient corresponding to each of the preset number of areas with highest numbers of service accessing users.

15. The non-transitory storage medium according to claim 13, wherein the calculating an area coefficient corresponding to each divided area further comprises:
provided that M represents the proximity principle contrast, N represents the proximity principle intensity, and U represents the number of service accessing users of a divided area, calculating the area coefficient corresponding to the divided area as $U^M \times N$.

16. The non-transitory storage medium according to claim 13, wherein the using the weighting coefficient corresponding to each divided area to perform a weighted random calculation to determine one of the plurality access points allocated to a current user for access at nearest proximity further comprises:
calculating an idle ratio corresponding to each access point providing the service;
obtaining a weighting coefficient of each access point based on the divided area of each access point;
based on the weighting coefficient and the idle ratio of each access point, obtaining a cluster idle ratio for all access points providing the service;
obtaining a cluster random idle ratio by multiplying the cluster idle ratio with a random number;
obtaining a difference value between the cluster random idle ratio and the idle ratio of one of the access points by subtracting from the cluster random idle ratio with the idle ratio of the one of the access points;
determining whether the difference value between the cluster random idle ratio and the idle ratio of the one of the access points is less than zero; and
when the difference value is less than zero, assigning the one of the access points as the allocated access point.

17. The non-transitory storage medium according to claim 16, wherein the obtaining the weighting coefficient of each access point based on the divided area of each access point and obtaining a cluster idle ratio for all access points providing the service further comprises:
obtaining the weighting coefficient of each access point based on the divided area of each access point;
obtaining a total number of all access points, a total number of access points in the divided area of the each access point, and a total number of access points in areas other than the divided area of the access point;
obtaining a weighting idle ratio of each access point by multiplying the weighting coefficient of the access point, the idle ratio corresponding to the access point, and a balancing coefficient corresponding to the access point, wherein the balancing coefficient is determined based on the total number of all access points, the number of access points in the divided area of the access point, and the number of the access points in areas other than the area of the access point; and
obtaining the cluster idle ratio by adding up the weighting idle ratios of each access point.

18. The non-transitory storage medium according to claim 16, wherein calculating an idle ratio corresponding to each access point providing a service further comprises:
determining whether the access point has fault; and
when it is determined that the access point has fault, setting the idle ratio corresponding to the access point to zero or a minimum value.

* * * * *